United States Patent
Myerscough et al.

(10) Patent No.: US 11,074,112 B2
(45) Date of Patent: Jul. 27, 2021

(54) MAINTAINING THE RESPONSIVENESS OF A USER INTERFACE WHILE PERFORMING A SYNCHRONOUS OPERATION

(71) Applicant: Microsoft Technology Licensing, LLC, Redmond, WA (US)

(72) Inventors: Micah James Myerscough, Redmond, WA (US); Weide Zhong, Sammamish, WA (US); Xiaohui Pan, Sammamish, WA (US); Toshiharu Kawai, Kirkland, WA (US); Emily Anne Schultz, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 447 days.

(21) Appl. No.: 15/406,093

(22) Filed: Jan. 13, 2017

(65) Prior Publication Data
US 2018/0203743 A1    Jul. 19, 2018

(51) Int. Cl.
*G06F 9/52* (2006.01)
*G06F 9/451* (2018.01)

(52) U.S. Cl.
CPC ............... *G06F 9/52* (2013.01); *G06F 9/451* (2018.02)

(58) Field of Classification Search
CPC .................................. G06F 9/52; G06F 9/451
See application file for complete search history.

(56) References Cited

U.S. PATENT DOCUMENTS

| | | | |
|---|---|---|---|
| 5,819,293 A | 10/1998 | Corner et al. | |
| 7,237,186 B2 | 6/2007 | Androski et al. | |
| 7,493,619 B1 * | 2/2009 | Englehart | G06F 8/10 713/161 |
| 8,577,846 B1 | 11/2013 | Axe et al. | |
| 8,990,818 B2 * | 3/2015 | Demircioglu | G06F 9/451 718/100 |
| 9,946,668 B1 * | 4/2018 | Galijasevic | G06F 13/26 |
| 2006/0235907 A1 * | 10/2006 | Kathuria | G06F 11/1461 |
| 2006/0282836 A1 * | 12/2006 | Barker | G06F 9/526 718/103 |
| 2008/0215959 A1 | 9/2008 | Lection | |
| 2010/0179943 A1 * | 7/2010 | Anand | G06F 11/1451 707/646 |
| 2012/0185762 A1 * | 7/2012 | Ozer | G06F 40/197 715/229 |
| 2012/0185767 A1 | 7/2012 | Schlegel | |
| 2013/0013875 A1 | 1/2013 | Brown et al. | |

(Continued)

OTHER PUBLICATIONS

Kirupa "Detecting If the User is Idle or Inactive", www.kirupa.com/html5/detecting_if_the_user_is_idle_or_inactive.htm, Sep. 11, 2013 (Year: 2013).*

(Continued)

*Primary Examiner* — Lewis A Bullock, Jr.
*Assistant Examiner* — Kevin X Lu (57) ABSTRACT

Systems, methods, and software are disclosed herein for maintain the responsiveness of a user interface to an application. In an implementation, a synchronous operation is commenced on a main thread of an application. The application monitors for a request by an additional thread to interrupt the synchronous operation in favor of an asynchronous operation. The synchronous operation is canceled in response to the request and is retried after completing the asynchronous operation.

20 Claims, 8 Drawing Sheets

(56) References Cited

U.S. PATENT DOCUMENTS

| | | | |
|---|---|---|---|
| 2014/0223377 A1 | 8/2014 | Shaw et al. | |
| 2014/0281088 A1* | 9/2014 | VanderLeest | G06F 13/26 |
| | | | 710/264 |
| 2015/0254806 A1* | 9/2015 | Circlaeys | H04N 21/238 |
| | | | 345/428 |
| 2015/0286533 A1 | 10/2015 | Kaufthal et al. | |
| 2016/0085583 A1* | 3/2016 | Goodson | G06F 9/4881 |
| | | | 718/108 |
| 2016/0321311 A1* | 11/2016 | Tallamraju | G06F 16/182 |
| 2018/0173874 A1* | 6/2018 | Muttik | G06F 11/1458 |

OTHER PUBLICATIONS

Martensen, "Events Concurrency and Javascript", danmartensen.svbtle.com/events-concurrency-and-javascript, Apr. 2015 (Year: 2015).*

Unknown author, "Eloquent Javascript—Chapter 15—Handling Events", eloquentjavascript.net/15_event.html, Jan. 2018 (Year: 2018).*

Cheusheva, Svetlana, "Move Excel spreadsheets online, share, embed on a web page and make interactive", https://www.ablebits.com/office-addins-blog/2014/03/28/excel-online-create-web-based-spreadsheets/, Published on: Mar. 28, 2014, 29 pages.

"How to change autosave time in excel?", http://web.archive.org/web/20150608055155/http:/www.extendoffice.com/documents/excel/2588-excel-change-autosave-time.html, Published on: Jun. 8, 2015, 5 pages.

"Wikihow to Save a Google Doc", http://www.wikihow.com/Save-a-Google-Doc, Retrieved on: Nov. 18, 2016, 3 pages.

\* cited by examiner

MAINTAINING THE RESPONSIVENESS OF A USER INTERFACE WHILE PERFORMING A SYNCHRONOUS OPERATION

TECHNICAL BACKGROUND

Many features in software applications may be implemented using either synchronous or asynchronous programming techniques. Synchronous operations are those that are invoked by a caller that must complete before returning control to the caller, whereas asynchronous operation can transfer control back to the caller before completing. As a consequence, synchronous operations have the potential to disrupt the user experience. For example, the user interface to an application may lock-up while the auto-save, save, or other synchronous operations are performed.

Cloning is one technique used to mitigate some of the effects of auto-save and save. With cloning, a copy of data is made in memory and the save operation is performed on the copy (synchronously or asynchronously). This can work well (and fast), as long as there is sufficient memory available for the operation. Another technique involves pausing the save operation long enough to allow for other operations to execute, especially operations involving user interaction with the user interface. This technique also works well, unless the other operation that interrupted the save operation changes what was being saved.

A given feature may be implemented asynchronously to avoid the drawbacks of synchronous operations. However, such an approach is not always possible and in any case, would merely expose a program to the drawbacks of asynchronous operations.

OVERVIEW

Technology is disclosed herein that maintains the responsiveness of a user interface to an application while the application performs a synchronous operation. In an implementation, a synchronous operation is commenced on a main thread of an application. The application monitors for a request by an additional thread to interrupt the synchronous operation in favor of an asynchronous operation. The synchronous operation is canceled in response to the request and is retried after completing the asynchronous operation.

The foregoing Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Technology is disclosed herein that allows the responsiveness of a user interface to an application to be maintained while a synchronous operation runs on a main thread of the application. In an implementation, the application monitors for a request to interrupt the synchronous operation. When the request originates from an asynchronous operation running on an additional thread of the application, the synchronous operation is canceled in favor of the asynchronous operation. The synchronous operation may then be retried after the asynchronous operation completes. The additional thread is a user interface thread of the application in some implementations, although it may be any other background thread of the application relative to the main thread.

A technical effect provided by the technology disclosed herein is the ability for an asynchronous operation to be carried out, even though a synchronous operation is executing on the main thread of an application. More specifically, the technology allows a user to interact with the user interface of an application, even though a synchronous operation may have begun. The synchronous operation may be canceled in favor of an asynchronous operation triggered by the user interaction, thereby having minimal impact on user interaction. For example, the risk of locking-out the user from interacting with the application will be mitigated. In addition to being responsive to user interaction, the synchronous operation may add itself back to the queue for execution on the main thread, thereby ensuring its eventual completion. Canceling and re-starting the synchronous operation has the added technical effect of ensuring that any changes made to data as a result of the intervening asynchronous operation are captured and accounted for.

In general, a synchronous operation may be any operation that blocks the progress of the rest of the application to which it belongs while the operation completes. An asynchronous operation in contrast allows other processing to occur before it completes. An operation is generally considered synchronous unless it is explicitly designed to be asynchronous. Some examples of synchronous operations in the context of spreadsheet applications include, but are not limited to, auto-save, save, recalculations, sorting, filtering, and committing changes or edits to a workbook, although the enhancement disclosed herein apply as well to applications outside of the context of spreadsheet (e.g. word processors). Examples of asynchronous operations include, but are not limited to, data refreshes, data previews, and fill down operations. Other examples include data updates or downloads and many networking operations (although some parts of a process may be synchronous).

In some implementations, monitoring for a request by the user interface thread of the application may involve checking a global flag set by the user interface thread or checking/ peeking in on the input event queue. In the same or other implementations, the synchronous operation (or task) may cancel itself. In addition, the synchronous operation may add itself back to the main thread's execution queue, in order to be retried after the asynchronous operation completes. The synchronous operation may be added to the beginning of the queue, the end, or inserted into an intermediate position in the queue.

As mentioned above, the synchronous operation may be an auto-save operation in some implementations. In the same or other implementations, the application may be a productivity application, such as a spreadsheet, word processing, presentation, note taking, video editing, and image editing applications, although any type of application is possible.

In order to retry the synchronous operation after completing the asynchronous operation, the application inserts the auto-save operation after the asynchronous operation in an execution queue for the main thread of the application. The synchronous operation, which may be implemented in code as a module, component, task, or other such element of the application, may add itself to the queue. The synchronous operation may also cancel itself in the same or other implementations.

Further still, the synchronous operation or other elements of the application may inspect requests to interrupt in order to determine whether or not to override a given request by canceling or postponing it, rather than cancelling the synchronous operation. This may occur when, for example, the requested operation is a long-running application that would take an unacceptable amount of time to complete, delaying the synchronous operation to too great a degree.

In such implementations, the synchronous operation may monitor for at least one other request by the user interface thread of the application to interrupt the synchronous operation in favor of a different asynchronous operation. Upon encountering such a request, the synchronous operation may override the other request. This may be useful when, for instance, the asynchronous operation takes a lesser amount of time to complete than the auto-save operation and wherein the different asynchronous operation takes a greater amount of time to complete than the auto-save operation.

Figure 1:
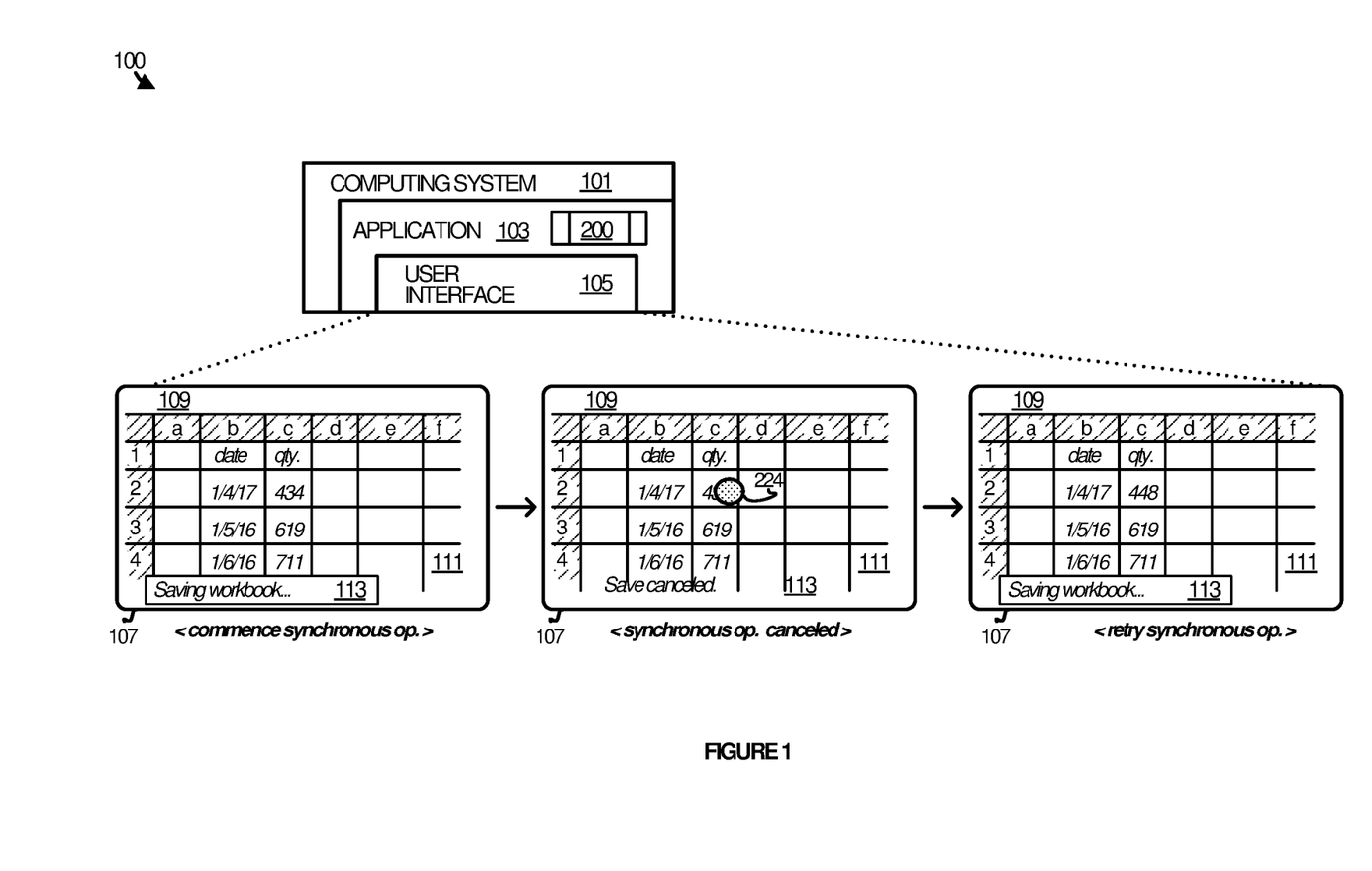
FIG. 1 illustrates an implementation of enhanced synchronous operations.

FIG. 1 illustrates an implementation 100 that is representative of synchronous operations that allow for maintaining the responsiveness of a user interface to an application. Implementation 100 involves computing system 101 on which application 103 runs. When executing, application 103 drives a user interface 105 through which a user may interact with the application.

Figure 8:
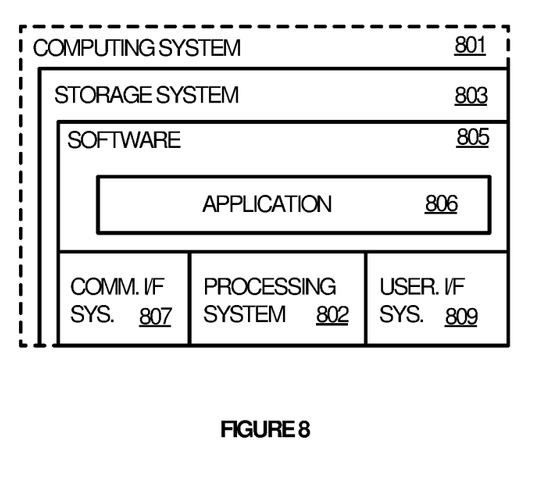
FIG. 8 illustrates a computing system suitable for implementing the software technology disclosed herein, including any of the applications, architectures, elements, processes, and operational scenarios and sequences illustrated in the Figures and discussed below in the Technical Disclosure.

Computing system 101 is representative of any computing system capable of running an application natively or in the context of a web browser, streaming an application, or executing an application in any other manner Examples of computing system 101 include, but are not limited to, personal computers, mobile phones, tablet computers, desktop computers, laptop computers, wearable computing devices, or any other form factor, including any combination of computers or variations thereof. Computing system 101 may include various hardware and software elements in a supporting architecture suitable for providing application 103. One such representative architecture is illustrated in FIG. 8 with respect to computing system 801.

Application 103 is representative of any software application capable of performing synchronous and asynchronous operations. Examples include, but are not limited to, spreadsheet applications, word processing applications, presentation applications, email applications, social networking applications, gaming applications, business management applications, note taking applications, video or image editing applications, and any other type of combination, variation, or combination thereof. Application 103 may be implemented as a natively installed and executed application, a browser-based application, a streaming or streamed application, a mobile application, or in any other suitable manner.

Figure 2:
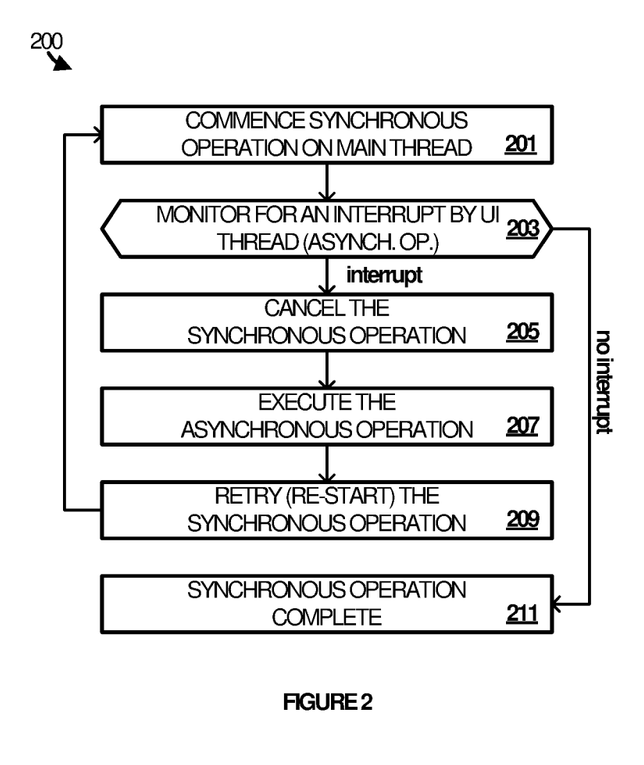
FIG. 2 illustrates an interrupt handling process in an implementation.

FIG. 2 illustrates an interrupt handling process 200 that may be employed by an application (e.g. application 103) to maintain the responsiveness of a user interface during a synchronous operation. Some or all of the steps of interrupt handling process 200 may be implemented in program instructions in the context of the component or components of the application used to carry out the synchronous operation on a main thread of the application. The program instructions direct a given application to operate as follows.

To begin, the application commences a synchronous operation on a main thread for the application (step 201). The synchronous operation may be triggered in response to a user input, it may be scheduled and called by another component of the application, or may be started for some other reason. In the example of an auto-save operation, a background operation may be programmed to commence the auto-save operation periodically or after certain events, for instance.

The synchronous operation (or possibly some other component of the application) monitors for a request to interrupt the synchronous operation that may originate from a user interface thread of the application (step 203). The user interface thread may make the request in response to a user interaction in the user interface the triggers an asynchronous operation. Thus, the request to interrupt the synchronous operation may be made by the user interface thread in favor of the asynchronous operation.

The interrupt may be indicated by a global flag or any other type of notifications, such as a passed parameter, polling, or callbacks. The value of the flag at any given time may signal to the synchronous operation whether or not an asynchronous operation is pending on the user interface thread that wants access to the main thread. The synchronous operation can check the flag periodically or at other intervals as it runs. In an example, a zero value may indicate no interrupt whereas a one value may indicate the presence of an interrupt request.

If no interrupt occurs, then the synchronous operation continues to execute as programmed until it completes (step 211). If an interrupt does occur, then the synchronous operation cancels itself (step 205) and the asynchronous operation executes (step 207). The synchronous operation may be re-tried (a.k.a. restarted) after the asynchronous operation has completed (step 209), at which point the interrupt handling process begins again.

Referring back to FIG. 1, application 101 may employ interrupt handling process 200 when driving user interface 105. In a brief operational scenario, user interface 105 includes a view 107 of a spreadsheet workbook hosted by application 101. The view 107 of the spreadsheet workbook includes a canvas 109 with cells 111 defined by rows and columns. In this scenario, two columns of data have been entered in the cell initially and synchronous operation has commenced as indicated by status window 113 (e.g. auto-save).

While the synchronous operation proceeds, a user interaction 224 occurs with respect to user interface 105. The user interaction 224 may be, for example, a touch, mouse click, voice command, or other such interaction. In this case, it may be assumed for exemplary purposes that cell "2c" is being edited. The user interaction 224 triggers an interrupt request on the user interface thread of application 101, requesting that the synchronous operation be interrupted. The status window 113 is no longer present to indicate that the synchronous operation stopped. In some implementations, the status windows 113 may be present to explain that the auto-save operation was canceled.

Once the asynchronous process triggered by the user interaction 224 has completed, the synchronous operation can re-start. Thus, the change made by the user to cell "2c" will be captured by the re-started auto-save operation. The status window 113 is surfaced again to indicate that the synchronous operation is working.

Figure 3:
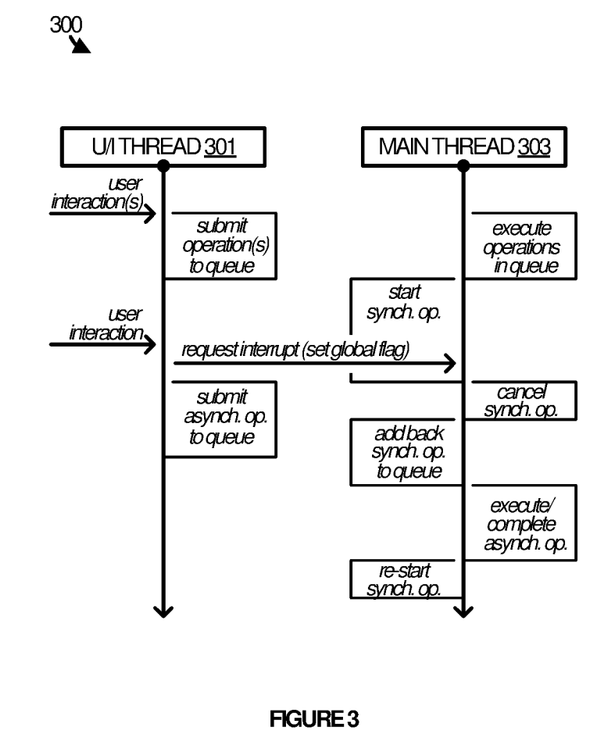
FIG. 3 illustrates a multi-threaded environment in an operational scenario.

FIG. 3 illustrates an operational scenario 300 that involves various threads in a multi-threaded environment. User interface thread 301 is representative of an application thread that handles user interactions with the user interface to the application. Main thread 303 is representative of the main thread of the application that handles core processing duties, including running at least some synchronous operations. User interface thread 301 and main thread 303 may be present in the run-time context of a multi-threaded application, e.g. application 103 in FIG. 1.

In operation, a user interaction occurs on user interface thread 301. User interface thread 303 identifies an operation to execute in response to the user interaction and submits the operation to the task queue associated with main thread 303. The operations submitted by user interface thread 301 may be synchronous or asynchronous operations (sometimes referred to as tasks). Main thread 303 generally executes the tasks in the order they are submitted to the queue, although exceptions and re-ordering may occur.

In this scenario, it is assumed for exemplary purposes that a synchronous operation is eventually encountered in the queue by main thread 303. Main thread 303 begins to execute the synchronous operation, but while it runs, another user interaction occurs on user interface thread 301. User interface thread 303 responsively requests an interrupt of the synchronous operation by setting a global value that may be checked periodically or at other intervals by the synchronous operation. Other types of notification are possible, such as passed parameters, polling, and callbacks.

The synchronous operation, employing a process the same as or similar to interrupt handling process 200, immediately cancels itself and adds itself back to the main thread's queue. In the meantime, user interface thread 301 has proceeded to submit the new asynchronous operation to the queue—possibly advancing it to the front of the queue. The main thread 303 executes the asynchronous operation and, once complete, moves on to the synchronous operation. The synchronous operation may be executed next, immediately after the achromous operation. However, in some scenarios one or more other intervening tasks may be performed before re-starting the synchronous operation.

Figure 4:
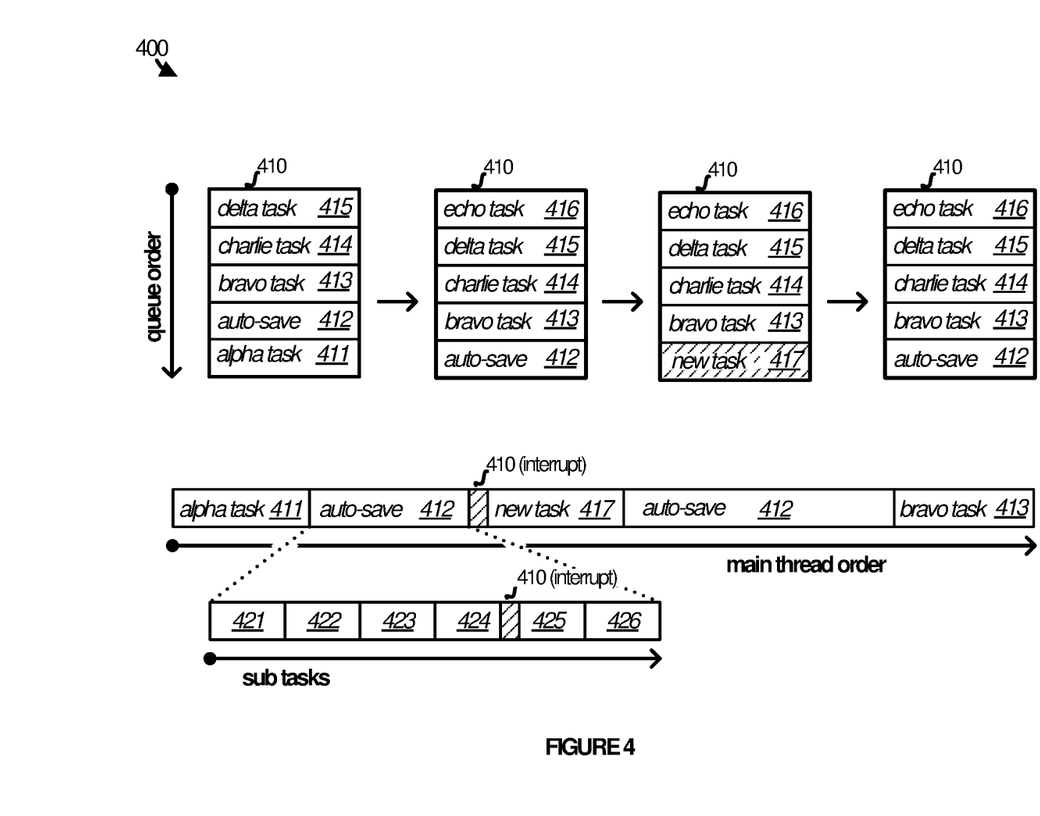
FIG. 4 illustrates a task queue in an operational scenario.

FIG. 4 provides a queue-based perspective in another operational scenario. In operational scenario 400, a queue 410 is illustrated, which pertains to tasks to be executed by the main thread of an application (e.g. main thread 303). The tasks in queue 410 are executed in a top-to-bottom order for exemplary purposes. At the outset, queue 410 includes five tasks represented by alpha task 411, auto-save 412, bravo task 413, charlie task 414, and delta task 415, to be executed in that order on the main thread of the application.

Operational scenario 400 also illustrates the order of execution on the main thread. Tasks are taken off the queue and executed on the main thread. For example, alpha tasks 411 is initially taken off the queue 410 and executed on the main thread. Auto-save 412 advances in the queue 410 and echo task 416 is added to the queue.

Auto-save 412 is executed next, but an interrupt 410 occurs while it is running Auto-save 412 includes various code blocks, represented by block 421, block 422, block 423, block 424, block 425, and block 426. Each block may represent a discrete collection of code that implements a particular function or routine within the context of auto-save 412. Auto-save 412, employing a process the same as or similar to interrupt handling process 200, detects the interrupt request during or after executing block 424 and proceeds to cancel itself. The new tasks 417 associated with the interrupt is added to the queue 410 (possibly by a user interface thread). Auto-save 412 adds itself back to the queue 410 and then the new tasks 417 can be executed on the main thread. Once the new task 417 is complete, auto-save 417 can be re-started.

Bravo task 413 follows auto-save 412, then charlie task 414, and so on. Auto-save 412 was inserted in the front of the queue 410 in this example. However, in some scenarios one or more other intervening tasks may be performed before re-starting auto-save 412. In other words, auto-save 412 could be placed at the end of queue 410 or inserted into an intermediate position in the queue.

Figure 5:
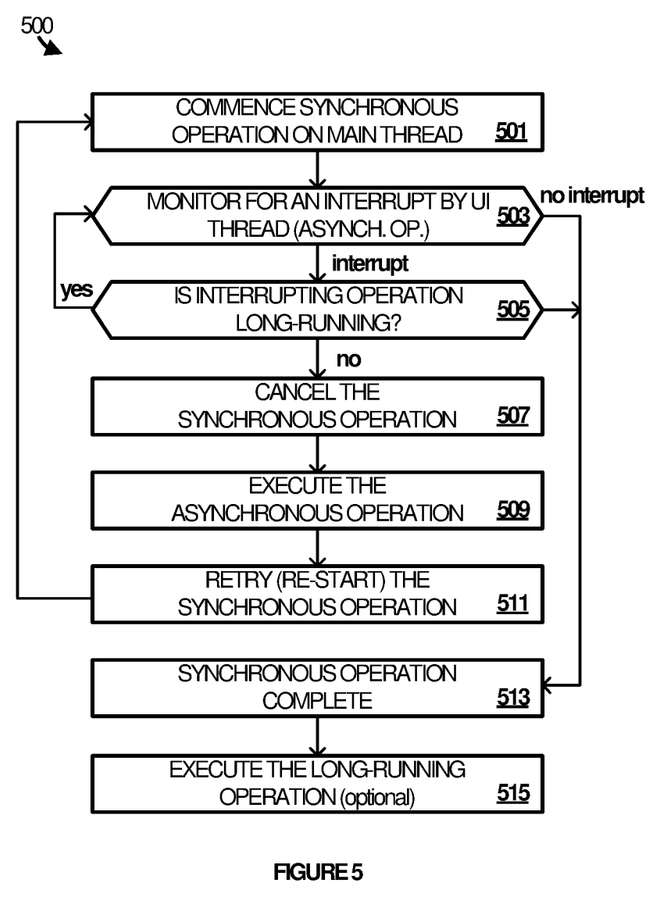
FIG. 5 illustrates an interrupt handling process in an implementation.

FIG. 5 illustrates another interrupt handling process that may be employed by an application (e.g. application 103) to maintain the responsiveness of a user interface during a synchronous operation when a long-running operation interrupts the synchronous operation. While the following refers to long-running operations, they are just one example of operations that may attempt to interrupt the synchronous operation but that can be selectively ignored by the synchronous operation. Thus, non-long running operations may be substituted for the long-running operation in the following discussion. Examples may include unimportant or low-priority operations. Some or all of the steps of interrupt handling process 500 may be implemented in program instructions in the context of the component or components of the application used to carry out the synchronous operation on a main thread of the application. The program instructions direct a given application to operate as follows.

To begin, the application commences a synchronous operation on a main thread for the application (step 501). The synchronous operation may be triggered in response to a user input, it may be scheduled and called by another component of the application, or may be started for some other reason. In the example of an auto-save operation, a background operation may be programmed to commence the auto-save operation periodically or after certain events, for instance.

The synchronous operation (or possibly some other component of the application) monitors for a request to interrupt the synchronous operation that may originate from a user interface thread of the application (step 503). The user interface thread may make the request in response to a user interaction in the user interface the triggers an asynchronous operation. Thus, the request to interrupt the synchronous operation may be made by the user interface thread in favor of the asynchronous operation.

The interrupt may be indicated by a global flag. The value of the flag at any given time may signal to the synchronous operation whether or not an asynchronous operation is pending on the user interface thread that wants access to the main thread. The synchronous operation can check the flag periodically or at other intervals as it runs. In an example, a zero value may indicate no interrupt whereas a one value may indicate the presence of an interrupt request.

If no interrupt occurs, then the synchronous operation continues to execute as programmed until it completes (step 513). If an interrupt does occur, then the operation determines whether or not the interrupt was made on behalf of a long-running operation (step 505). Long-running operations may be identified by their presence in a list that the synchronous operation may check in response to an interrupt. In other examples, the value of the global flag may be configurable to indicate the nature of the operation (e.g. long-running or not), in addition to the occurrence of the interrupt. Other types of notification are possible, such as passed parameters, polling, and callbacks.

A long-running operation may be a synchronous or asynchronous operation. In either case, the long-running operation may take a greater amount of time to complete than the synchronous operation itself, while in most cases other asynchronous operations would take a shorter amount of time to complete than the synchronous operation being interrupted.

If the interrupting operation is a long-running operation, then the synchronous operation continues to execute as programmed until it completes or unless another interrupt is detected. Eventually, the synchronous operation may complete at which time the long-running operation may execute (step 515).

If the interrupting operation is not a long-running operation, then the synchronous operation cancels itself (step 507) and the asynchronous operation executes (step 509). The synchronous operation may be re-tried after the asynchronous operation has completed (step 511), at which point the interrupt handling process begins again.

Figure 6:
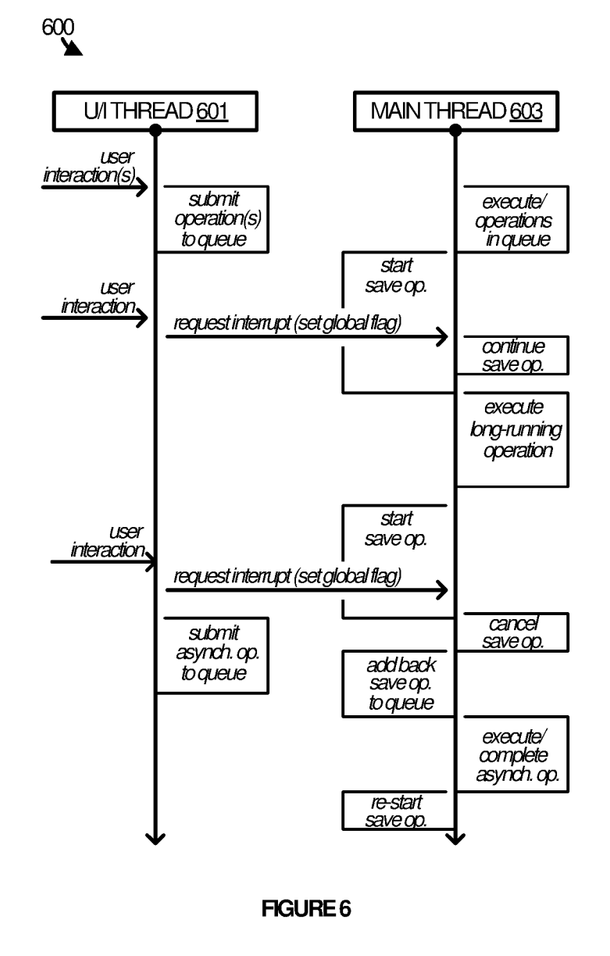
FIG. 6 illustrates a multi-threaded environment in an operational scenario.

FIG. 6 illustrates another operational scenario that involves various threads in a multi-threaded environment. In operational scenario 600, user interface thread 601 is representative of an application thread that handles user interactions with the user interface to the application. Main thread 603 is representative of the main thread of the application that handles core processing duties, including running at least some synchronous operations. User interface thread 601 and main thread 603 may be present in the run-time context of a multi-threaded application, e.g. application 603 in FIG. 1.

In operation, a user interaction occurs on user interface thread 601. User interface thread 603 identifies an operation to execute in response to the user interaction and submits the operation to the task queue associated with main thread 303. The operations submitted by user interface thread 601 may be synchronous or asynchronous operations or tasks. Main thread 603 executes the tasks in the order they are submitted to the queue, although exceptions and re-ordering may occur.

In this scenario, it is assumed for exemplary purposes that a synchronous operation (e.g. save) is eventually encountered in the queue by main thread 603. Main thread 603 begins to execute the synchronous operation, but while it runs, another user interaction occurs on user interface thread 601. User interface thread 603 responsively requests an interrupt of the synchronous operation by setting a global value that may be checked periodically or at other intervals by the synchronous operation.

The synchronous operation, employing a process the same as or similar to interrupt handling process 500, checks whether or not the interrupt is for a long-running application. If so, the synchronous operation continues to execute. This may be beneficial in situations where, for example, the long-running application would prevent a save operation from completing for too great an amount of time. A long-running operation of that type might be, for instance, a data calculation or refresh prompted by a user interaction or other such event capable of triggering the long-running application.

Once the synchronous operation has completed, it may be possible for the long-running operation to execute, assuming it has been added to the task queue. Eventually, the same or another synchronous operation begins again. This may be the case in the context of auto-save, for example, where the operation runs periodically.

While it runs, another user interaction occurs on user interface thread 601. User interface thread 603 responsively requests another interrupt of the synchronous operation by setting a global value that may be checked periodically or at other intervals by the synchronous operation.

The synchronous operation, still employing a process the same as or similar to interrupt handling process 500, checks whether or not the interrupt is for a long-running application. At this point in the scenario, it is assumed for exemplary purposes that the second interrupt is on behalf of a non-long running operation. The synchronous operation immediately cancels itself and adds itself back to the main thread's queue.

In the meantime, user interface thread 601 has proceeded to submit the new asynchronous operation to the queue—possibly advancing it to the front of the queue. The main thread 603 executes the asynchronous operation and, once complete, moves on to the synchronous operation. The synchronous operation may be executed next, immediately after the achromous operation. However, in some scenarios one or more other intervening tasks may be performed before re-starting the synchronous operation.

Figure 7:
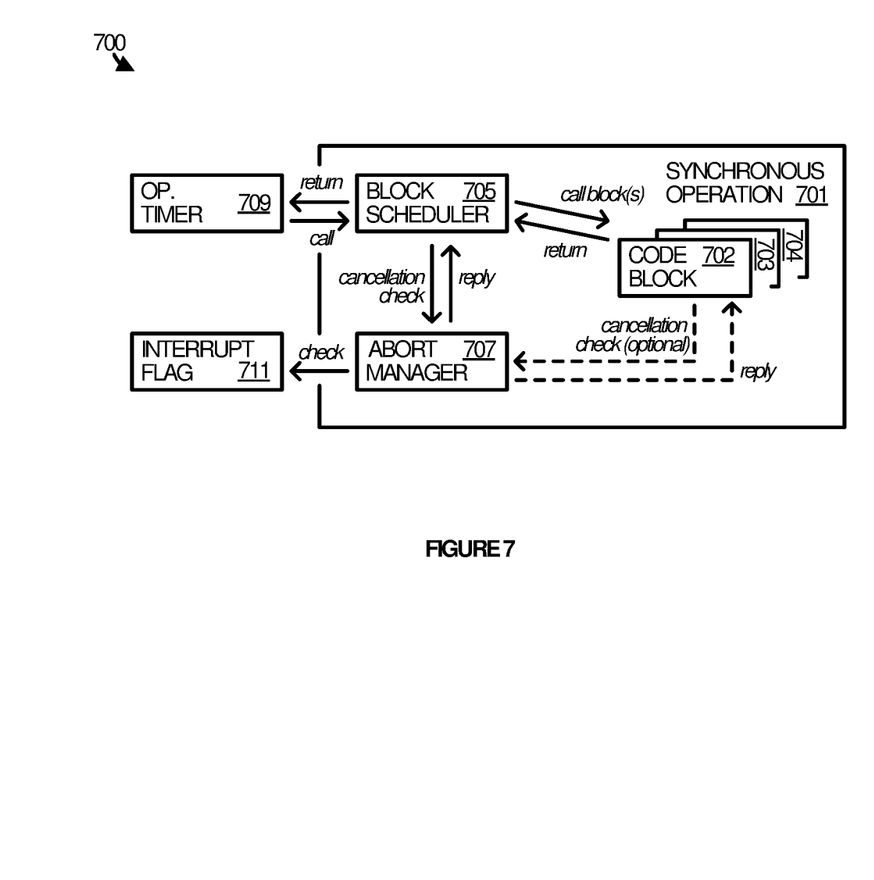
FIG. 7 illustrates a software architecture and associated operations in an implementation of enhanced synchronous operations.

FIG. 7 illustrates a software architecture 700 that may be employed in the context of an application (e.g. application 103) to maintain the responsiveness of a user interface while a synchronous operation executes. Software architecture 700 includes, but is not limited to, synchronous operation 701, which itself includes various elements that may interact with an operation timer 709 and an interrupt flag 711. In particular, synchronous operation 701 includes various code blocks that perform the given function or feature of synchronous operation 701, represented by code block 702, code block 703, and code block 704.

As an example, synchronous operation 701 may be representative of auto-save, in which case each of the various code blocks represents a discrete piece of code that runs in furtherance of the auto-save operation. The synchronous operation 701 may be divided into code blocks during a design and/or development phase based time constrains to ensure that each code block executes within a threshold amount of time (e.g. 50 msec), although some code blocks may exceed the threshold.

Synchronous operation 701 also includes a block scheduler 705 that schedules the code blocks. Block schedule 705 calls a specific code block when its turn in an operation sequence arrives. A given code block passes control back to block scheduler 705 when it completes, so that block scheduler 705 can call the next block or return control to an operation timer 709.

Operation timer 709 is a timer that runs in the context of the application to which synchronous operation 701 belongs. Operation timer 709 can be set to launch the synchronous operation 701 periodically or at other intervals. As an example, the auto-save operation may be set to run every thirty seconds, every minute, and so on. The timer can be adjusted based on operational conditions, such as when or to what extent any editing has occurred with respect to a document, spreadsheet, or other such content.

Abort manager 707 is another component of synchronous operation 701 that manages cancellation checks for block scheduler 705 and optionally for a code block under some circumstances. Block scheduler 705 checks with abort manager 707 after a given code block returns control to it. Abort manager 707 checks the status of an interrupt flag 711 or determines by some other means whether or not another operation has requested to interrupt the functioning of synchronous operation 701. Abort manager 707 may read the value of a flag, peek in on a message queue, or otherwise detect a cancellation.

In an operational example, operation timer 709 is set to start synchronous operation 701 after a given period of time. When the period of time expires, operation timer 709 calls block scheduler 705. Block scheduler 705 proceeds to call the code blocks into which synchronous operation 701 was divided during a design period. Using code block 702 as an example, code block 702 performs its segment of the synchronous operation.

Upon completing, code block 702 normally returns control to block scheduler 705. In response, block scheduler 705 checks with abort manager 707 to ascertain whether or not an interrupt occurred while code block 702 was running. If no interrupt occurred, then block scheduler 705 proceeds to call the next code block in an order of operation, e.g. code block 703. Block scheduler 705 checks with abort manager 707 after the completion of each code block and before calling the next code block, e.g. code block 704. If no interrupt has occurred, then block scheduler 705 proceeds to the next code block, eventually reaching the end of the code blocks in synchronous operation 701. Upon synchronous operation 701 completing, block scheduler 705 may return control to operational timer 709, to be called again at the expiration of the next period of time or some other triggering event.

However, if an interrupt did occur, then block scheduler 705 returns control to operation timer 709 immediately—as if synchronous operation 701 had completed. This step may occur after the completion of any of the code blocks, thereby facilitating the nearly instantaneous cancellation of synchronous operation 701 in response to an interrupt on behalf of an asynchronous operation. In other words, synchronous operation 709 may be canceled after the completion of any one of its code blocks by virtue of block scheduler 705 returning control to operation timer 709.

In addition, synchronous operation 709 may be retried after a cancellation by virtue of operation timer 709 restarting. The next expiration of operation timer 709 then results in synchronous operation 709 being added to the execution queue of the main thread of the application. In some cases, operation timer 709 may be programmed call synchronous operation 701 immediately upon the competition of the interrupting asynchronous operation by dynamically adjusting down the amount of time set by the timer. In other cases, operation timer 709 may be programmed to delay re-calling synchronous operation 701 depending upon the nature of the asynchronous operation. For example, if the interrupt relates to editing being performed by the end-user in the user interface, operation timer 709 may delay re-trying the synchronous operation 701 for a number of seconds or longer, to accommodate the editing in the user interface.

The scenario above assumes that each code block has been determined via instrumentation to take a certain amount of time to complete (e.g. less than 50 msec). However, some code blocks may exceed a threshold amount of time. Such blocks may be able to check with abort manager 707 themselves whether or not an interrupt occurred. In such implementations, a code block would be notified of abort manager 707 of the interrupt and can responsively return control to block scheduler 705.

Block scheduler 705 could proceed directly to the step of returning control to operation timer 709, thereby cancelling synchronous operation 701. However, block scheduler 705 could also check with abort manager 707 as to the interrupt, albeit redundantly in view of the code block checking. In either case, the end result would be the cessation of the synchronous operation, the execution of the asynchronous operation, and the re-trying of the synchronous operation once the asynchronous operation has completed.

FIG. 8 illustrates computing system 801, which is representative of any system or collection of systems in which the various applications, services, scenarios, and processes disclosed herein may be implemented. Examples of computing system 801 include, but are not limited to, desktop computers, laptop computers, tablet computers, computers having hybrid form-factors, mobile phones, smart televisions, wearable devices, server computers, blade servers, rack servers, and any other type of computing system (or collection thereof) suitable for carrying out the enhanced synchronous operations described herein. Such systems may employ one or more virtual machines, containers, or any other type of virtual computing resource in the context of supporting synchronous operations.

Computing system 801 may be implemented as a single apparatus, system, or device or may be implemented in a distributed manner as multiple apparatuses, systems, or devices. Computing system 801 includes, but is not limited to, processing system 802, storage system 803, software 805, communication interface system 807, and user interface system 809. Processing system 802 is operatively coupled with storage system 803, communication interface system 807, and user interface system 809.

Processing system 802 loads and executes software 805 from storage system 803. Software 805 includes application 805 which is representative of the software applications discussed with respect to the preceding FIGS. 1-7, including application 103. When executed by processing system 802 to enhance synchronous operations and the responsiveness of a user interface, application 805 directs processing system 802 to operate as described herein for at least the various processes, operational scenarios, and sequences discussed in the foregoing implementations. Computing system 801 may optionally include additional devices, features, or functionality not discussed for purposes of brevity.

Referring still to FIG. 8, processing system 802 may comprise a micro-processor and other circuitry that retrieves and executes software 805 from storage system 803. Processing system 802 may be implemented within a single processing device, but may also be distributed across multiple processing devices or sub-systems that cooperate in executing program instructions. Examples of processing system 802 include general purpose central processing units, application specific processors, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 803 may also include computer readable communication media over which at least some of software 805 may be communicated internally or externally. Storage system 803 may be implemented as a single storage device, but may also be implemented across multiple storage devices or sub-systems co-located or distributed relative to each other. Storage system 803 may comprise additional elements, such as a controller, capable of communicating with processing system 802 or possibly other systems.

Software 805 in general, and application 805 in particular, may be implemented in program instructions and among other functions may, when executed by processing system 802, direct processing system 802 to operate as described with respect to the various operational scenarios, sequences, and processes illustrated herein. For example, application 805 may include program instructions for implementing an interrupt handling process, such as interrupt handling process 200 and interrupt handling process 500.

In particular, the program instructions may include various components or modules that cooperate or otherwise interact to carry out the various processes and operational scenarios described herein. The various components or modules may be embodied in compiled or interpreted instructions, or in some other variation or combination of instructions. Software 805 may include additional processes, programs, or components, such as operating system software, virtual machine software, or other application software, in addition to or that include application 805. Software 805 may also comprise firmware or some other form of machine-readable processing instructions executable by processing system 802.

In general, application 805 may, when loaded into processing system 802 and executed, transform a suitable apparatus, system, or device (of which computing system 801 is representative) overall from a general-purpose computing system into a special-purpose computing system customized to enhance synchronous operations. Indeed, encoding application 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, as well as other factors.

For example, if the computer readable storage media are implemented as semiconductor-based memory, application 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 807 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 809 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 809. In some cases, the input and output devices may be combined in a single device, such as a display capable of displaying images and receiving touch gestures. The aforementioned user input and output devices are well known in the art and need not be discussed at length here.

User interface system 809 may also include associated user interface software executable by processing system 802 in support of the various user input and output devices discussed above. Separately or in conjunction with each other and other hardware and software elements, the user interface software and user interface devices may support a graphical user interface, a natural user interface, or any other type of user interface, in which a user interface to an application may be presented (e.g. user interface 105).

Communication between computing system 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. In any of the aforementioned examples in which data, content, or any other type of information is exchanged, the exchange of information may occur in accordance with any of a variety of well-known data transfer protocols.

Certain inventive aspects may be appreciated from the foregoing disclosure, of which the following are various examples.

Example 1

A computing apparatus comprising: one or more computer readable storage media; a processing system operatively coupled with the one or more computer readable storage media; and program instructions stored on the one or more computer readable storage media for performing a synchronous operation on a main thread of an application and maintaining responsiveness in a user interface to the application; wherein the program instructions, when executed by the processing system, direct the processing system to at least: commence the synchronous operation on the main thread of the application; monitor for a request by an additional thread of the application to interrupt the synchronous operation in favor of an asynchronous operation; cancel the synchronous operation in response to the request; and retry the synchronous operation after completing the asynchronous operation.

Example 2

The computing apparatus of Example 1 wherein the synchronous operation comprises an auto-save operation, wherein the additional thread of the application comprises a user interface thread, and wherein a user interaction in the user interface of the application prompts the user interface thread to make the request to interrupt the synchronous operation in favor of the asynchronous operation.

Example 3

The computing apparatus of Examples 1-2 wherein to retry the synchronous operation after completing the asynchronous operation, the program instructions direct the processing system to insert the auto-save operation after the asynchronous operation in an execution queue for the main thread of the application.

Example 4

The computing apparatus of Examples 1-3 wherein the program instructions further direct the processing system to monitor for at least one other request by the user interface thread of the application to interrupt the synchronous operation in favor of a different asynchronous operation.

Example 5

The computing apparatus of Examples 1-4 wherein the program instructions further direct the processing system to override the other request by the user interface thread of the application in favor of the auto-save operation.

Example 6

The computing apparatus of Examples 1-5 wherein the asynchronous operation takes a lesser amount of time to complete than the auto-save operation and wherein the different asynchronous operation takes a greater amount of time to complete than the auto-save operation.

Example 7

The computing system of Examples 1-6 wherein to monitor for the request by the user interface thread of the application, the program instructions direct the processing system to check a global flag set by the user interface thread.

Example 8

A method for performing a synchronous operation on a main thread of an application while maintaining responsiveness in a user interface to the application, the method comprising: commencing the synchronous operation on the main thread of the application; monitoring for a request by an additional thread of the application to interrupt the synchronous operation in favor of an asynchronous operation; canceling the synchronous operation in response to the request; and retrying the synchronous operation after completing the asynchronous operation.

Example 9

The method of Example 8 wherein the synchronous operation comprises an auto-save operation, wherein the additional thread of the application comprises a user interface thread, and wherein a user interaction in the user interface of the application prompts the user interface thread to make the request to interrupt the synchronous operation in favor of the asynchronous operation.

Example 10

The method of Example 8-9 wherein retrying the synchronous operation after completing the asynchronous operation comprises inserting the auto-save operation after the asynchronous operation in an execution queue for the main thread of the application.

Example 11

The method of Examples 8-10 further comprising monitoring for at least one other request by the user interface thread of the application to interrupt the synchronous operation in favor of a different asynchronous operation.

Example 12

The method of Examples 8-11 further comprising overriding the other request by the user interface thread of the application in favor of the auto-save operation.

Example 13

The method of Examples 8-12 wherein the asynchronous operation takes a lesser amount of time to complete than the auto-save operation and wherein the different asynchronous operation takes a greater amount of time to complete than the auto-save operation.

Example 14

The method of Examples 8-13 wherein monitoring for the request by the user interface thread of the application comprises checking a global flag set by the user interface thread.

Example 15

One or more computer readable storage media having program instructions stored thereon for performing a synchronous operation on a main thread of an application while maintaining responsiveness in a user interface to the application, wherein the program instructions, when executed by a processing system, direct the processing system to at least: commence the synchronous operation on the main thread of the application; monitor for a request by an additional thread of the application to interrupt the synchronous operation in favor of an asynchronous operation; cancel the synchronous operation in response to the request; and retry the synchronous operation after completing the asynchronous operation.

Example 16

The one or more computer readable storage media of Example 15 the synchronous operation comprises an auto-save operation and wherein the application comprises a productivity application.

Example 17

The one or more computer readable storage media of Examples 15-16 wherein to retry the synchronous operation after completing the asynchronous operation, the program instructions direct the processing system to insert the auto-save operation after the asynchronous operation in an execution queue for the main thread of the application.

Example 18

The one or more computer readable storage media of Examples 15-17 wherein the program instructions further direct the processing system to monitor for at least one other request by the user interface thread of the application to interrupt the synchronous operation in favor of a different asynchronous operation.

Example 19

The one or more computer readable storage media of Examples 15-18 wherein the program instructions further direct the processing system to override the other request by the user interface thread of the application in favor of the auto-save operation.

Example 20

The one or more computer readable storage media of Examples 15-19 wherein the asynchronous operation takes a lesser amount of time to complete than the auto-save operation and wherein the different asynchronous operation takes a greater amount of time to complete than the auto-save operation.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. A computing apparatus comprising:
one or more computer readable storage media;
a processing system operatively coupled with the one or more computer readable storage media; and
program instructions stored on the one or more computer readable storage media for performing a synchronous operation on a main thread of an application and maintaining responsiveness in a user interface to the application;
wherein the program instructions, when executed by the processing system, direct the processing system to at least:
start the synchronous operation on the main thread of the application at a beginning of the synchronous operation, wherein the synchronous operation comprises an auto-save operation;
via the synchronous operation, detect a request by an additional thread of the application to interrupt the synchronous operation in favor of an asynchronous operation, wherein the additional thread comprises a user interface thread that generates the request in response to an input received via the user interface;
via the synchronous operation, cancel the synchronous operation in response to the request;
immediately after completing the asynchronous operation, restart the synchronous operation from the beginning of the synchronous operation;
detect at least one other request by the additional thread to interrupt the synchronous operation in favor of a different asynchronous operation; and
override the one other request in favor of the synchronous operation.

2. The computing apparatus of claim 1 wherein the main thread includes an execution queue having an order in which operations are executed, and wherein the program instructions, when executed by the processing system, further direct the processing system to, subsequent to canceling the synchronous operation, insert the synchronous operation in the execution queue in a position of the order immediately after the asynchronous operation.

3. The computing apparatus of claim 1 wherein the program instructions further direct the processing system to, responsive to detecting the input to the user interface of the application, generate the request via the additional thread.

4. The computing apparatus of claim 1 wherein the application includes an input event queue, and wherein to detect the request, the program instructions direct the processing system to scan the input event queue.

5. The computing apparatus of claim 1 wherein the synchronous operation further comprises at least one of an operation timer, a block scheduler, and an abort manager.

6. The computing apparatus of claim 1 wherein the asynchronous operation takes a lesser amount of time to complete than the synchronous operation and wherein the different asynchronous operation takes a greater amount of time to complete than the synchronous operation.

7. The computing apparatus of claim 1 wherein to detect the request, the program instructions direct the processing system to check a global flag set by the additional thread.

8. A method for performing a synchronous operation on a main thread of an application while maintaining responsiveness in a user interface to the application, the method comprising:

starting the synchronous operation on the main thread of the application at a beginning of the synchronous operation, wherein the synchronous operation comprises an auto-save operation;

via the synchronous operation, detecting a request by an additional thread of the application to interrupt the synchronous operation in favor of an asynchronous operation, wherein the additional thread comprises a user interface thread that generates the request in response to an input received via the user interface;

via the synchronous operation, canceling the synchronous operation in response to the request;

immediately after completing the asynchronous operation, restarting the synchronous operation from the beginning of the synchronous operation;

detecting at least one other request by the additional thread to interrupt the synchronous operation in favor of a different asynchronous operation; and overriding the one other request in favor of the synchronous operation.

9. The method of claim 8 wherein the main thread includes an execution queue having an order in which operations are executed, and wherein the method further comprises, subsequent to canceling the synchronous operation, inserting the synchronous operation in the execution queue in a position of the order immediately after the asynchronous operation.

10. The method of claim 8 further comprising, responsive to detecting the input to the user interface of the application, generating the request via the additional thread.

11. The method of claim 8 wherein the application includes an input event queue, and wherein detecting the request comprises scanning the input event queue.

12. The method of claim 8 wherein the synchronous operation further comprises at least one of an operation timer, a block scheduler, and an abort manager.

13. The method of claim 12 wherein the asynchronous operation takes a lesser amount of time to complete than the synchronous operation and wherein the different asynchronous operation takes a greater amount of time to complete than the synchronous operation.

14. The method of claim 8 wherein detecting the request comprises checking a global flag set by the additional thread.

15. One or more non-transitory computer readable storage media having program instructions stored thereon for performing a synchronous operation on a main thread of an application while maintaining responsiveness in a user interface to the application, wherein the program instructions, when executed by a processing system, direct the processing system to at least:

start the synchronous operation on the main thread of the application at a beginning of the synchronous operation, wherein the synchronous operation comprises an auto-save operation;

via the synchronous operation, detect a request by a user interface thread of the application to interrupt the synchronous operation in favor of an asynchronous operation, wherein the user interface thread generates the request in response to an input received via the user interface;

via the synchronous operation, cancel the synchronous operation in response to the request;

immediately after completing the asynchronous operation, restart the synchronous operation from the beginning of the synchronous operation;

detect at least one other request by the user interface thread to interrupt the synchronous operation in favor of a different asynchronous operation; and override the one other request in favor of the synchronous operation.

16. The non-transitory one or more computer readable storage media of claim 15 wherein the main thread includes an execution queue having an order in which operations are executed, and wherein the program instructions, when executed by the processing system, further direct the processing system to, subsequent to canceling the synchronous operation, insert the synchronous operation in the execution queue in a position of the order immediately after the asynchronous operation.

17. The non-transitory one or more computer readable storage media of claim 15 wherein the program instructions further direct the processing system to, responsive to detecting the input to the user interface of the application, generate the request via the user interface thread.

18. The non-transitory one or more computer readable storage media of claim 15 wherein to detect the request, the program instructions direct the processing system to check a global flag set by the user interface thread.

19. The non-transitory one or more computer readable storage media of claim 15 wherein the application includes an input event queue, and wherein to detect the request, the program instructions further direct the processing system to scan the input event queue.

20. The non-transitory one or more computer readable storage media of claim 15 wherein the asynchronous operation takes a lesser amount of time to complete than the synchronous operation and wherein the different asynchronous operation takes a greater amount of time to complete than the synchronous operation.

* * * * *